July 3, 1962 F. J. BARRA ETAL 3,041,876
APPARATUS FOR METERING LIQUIDS
Filed March 20, 1958 2 Sheets-Sheet 2

Frank J. Barra,
William F. Chaple &
Robert E. McMinn
INVENTORS

BY
ATTORNEY

United States Patent Office 3,041,876
Patented July 3, 1962

3,041,876
APPARATUS FOR METERING LIQUIDS
Frank J. Barra, William F. Chaple, and Robert E. McMinn, Oklahoma City, Okla., assignors to Black, Sivalls & Bryson, Inc., Kansas City, Mo., a corporation of Delaware
Filed Mar. 20, 1958, Ser. No. 722,680
2 Claims. (Cl. 73—224)

The present invention relates generally to an apparatus for metering liquids and more specifically to an apparatus for a control system for the automatic metering and discharge of liquids from the metering apparatus.

The metering of liquids, particularly oil and hydrocarbon condensates from oil and gas wells, has always been comparatively difficult and most often is accomplished by dumping the liquids into a storage tank and then manually gauging the tank to determine the volume of liquid contained therein. Such a system of metering oils and condensates from oil and gas wells requires the services of an individual to gauge the tank. It would be advantageous to eliminate the necessity of such manual operation, particularly in locations having limited access such as mountainous terrain, off shore and extreme cold weather operations. This elimination of a manual operation will allow such remote wells to function without the presence of any operating personnel whereby the liquid hydrocarbons can be metered, the metering recorded and the liquids delivered to a pipeline. Therefore, the primary object of the present invention is to provide a control system to perform automatically the metering of liquid and the discharge of the metered liquids from the metering system.

Another object of the present invention is to provide a control system for automatically metering liquid hydrocarbon production.

A further object of the present invention is to provide a control system for an apparatus for metering liquids in which the system is controlled to meter a volume of liquid within a volume container of known volume.

In accomplishing these and other objects of the present invention, we have provided improved details of structure, the preferred form of which is illustrated in the accompanying drawings wherein.

Figure 1:
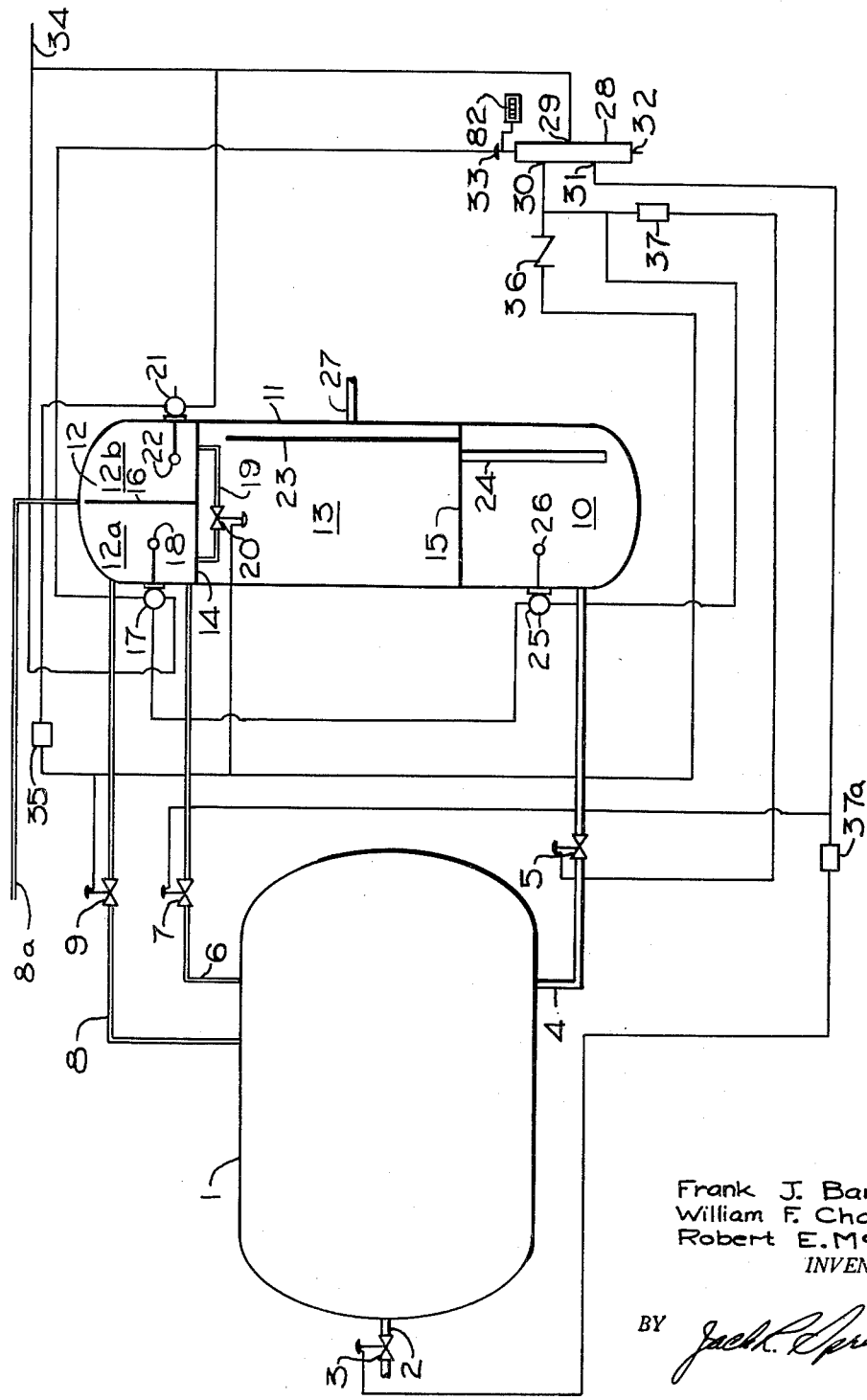
FIG. 1 is a schematic diagram of a metering system and apparatus constructed in accordance with the present invention.

Referring more in detail to the drawings:

Metering vessel 1 as illustrated in FIG. 1 has an inlet connection 2 controlled by inlet valve 3, an outlet connection 4 controlled by outlet valve 5, an overflow connection 6 controlled by valve 7 and a pressure equalizing connection 8 controlled by valve 9. Line 8a is a pressure equalizing connection to other parts of the system. If the gas pressure in the other parts of the system to which line 8a connects is not sufficient to assist in the discharge of liquids from the vessels as hereinafter more fully explained, line 8a may be connected to a suitable source of gas pressure. The volume contained within metering vessel 1 and its connections 2, 4, 6 and 8 as defined by valves 3, 5, 7 and 9 is a volume which can readily be ascertained and therefore will be hereinafter designated as a known volume. Outlet connection 4 extends and connects into the lower chamber 10 of vessel 11. Overflow connection 6 and pressure equalizing connection 8 both extend and connect into upper overflow chamber 12 of vessel 11 as shown.

Vessel 11 is divided into an upper overflow chamber 12, a lower chamber 10 and an intermediate chamber 13 by transverse partitions 14 and 15. Upper overflow chamber 12 is divided into two sections 12a and 12b by vertical partition 16. Vertical partition 16 extends upwardly from upper transverse partition 14 in the center of upper overflow chamber 12 and terminates short of the upper surface of chamber 12. Liquid level pilot 17 is positioned to have its float 18 within the section 12a of chamber 12. Sections 12a and 12b of chamber 12 are connected at their lower extremities by duct 19 which is controlled by valve 20. It should be understood that the drawings are schematic and that connection such as duct 19 could readily be made externally of vessel 11 rather than being within intermediate chamber 13. Liquid level pilot 21 has its float 22 positioned within section 12b of chamber 12.

Pressure equalizing pipe 23 extends through lower transverse partition 15 into the upper portion of intermediate chamber 13 of vessel 11. Duct 24 extends downwardly through lower transverse partition 15 into the lower portion of chamber 10. Liquid level pilot 25 has its float 26 positioned within lower chamber 10 of vessel 11. Discharge line 27 from vessel 11 extends from intermediate chamber 13 to some suitable storage or pipeline (not shown) connecting to a transmission system.

Pilot valve 28 is a two-position type valve in which its supply port 29 is connected to outlet port 30 in one position and supply port 29 is connected to outlet port 31 in its other position. Also, it should be noted that the outlet port of pilot valve 28 which is not connected to supply port 29 will be connected to exhaust port 32. Actuator 33 is connected to pilot valve 28 and is illustrated as a diaphragm type actuator.

Supply line 34 connects into supply port 29 of pilot valve 28, to liquid level pilot 17 and to liquid level pilot 21. The other side of liquid level pilot 21 connects through special valve 35 to the actuator for valve 9, to the actuator of valve 20 and through check valve 36 to port 30 in pilot valve 28. Special valve 35 is constructed to allow full flow of supply gas in the direction from liquid level pilot 21 to valves 9 and 20 and to restrict the flow of supply gas in the opposite direction. Check valve 36 should be installed to allow flow of supply gas from port 30 of valve 28 and to prevent flow in the opposite direction.

Port 30 of pilot valve 28 is connected through liquid level pilot 25 to the exhaust connection of liquid level pilot 17. The lower connection of pilot 17 connects to supply line 34 and the upper connection connects to actuator 33 of pilot valve 28.

Port 30 is connected through special valve 37 to actuate outlet valve 5. Special valve 37 is connected to allow full flow in the direction from valve 3 toward pilot valve 28 and to restrict the flow in the opposite direction.

Port 31 is connected to actuate valve 7 and is connected through special valve 37a to actuate valve 3.

Figure 2:
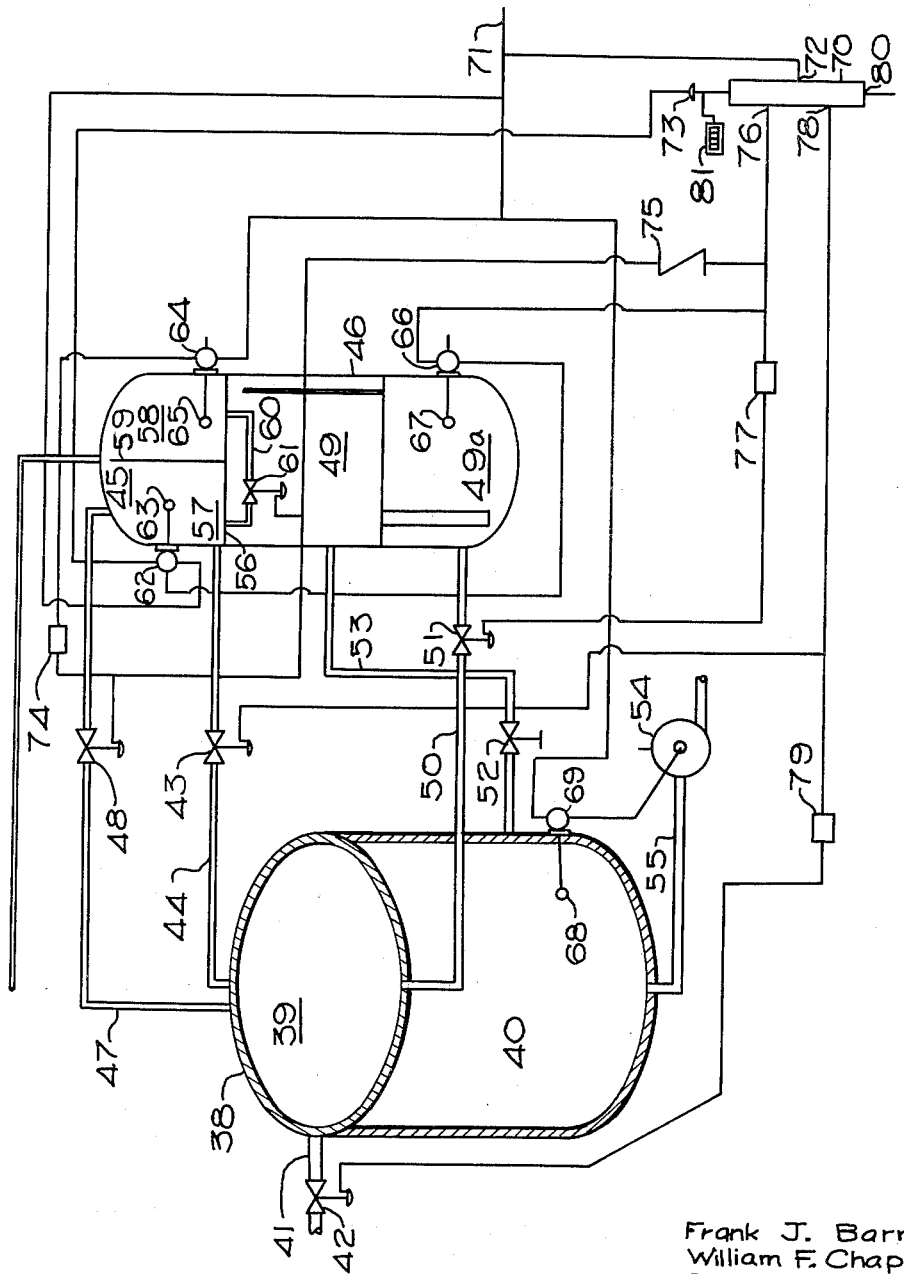
FIG. 2 is a schematic diagram of a modified form of metering system and apparatus constructed in accordance with the present invention.

Referring to the details of FIG. 2, vessel 38 is constructed to have an upper metering chamber 39 and a lower surge chamber 40. Inlet 41 is controlled by valve 42. Valve 43 controls the flow through overflow duct 44 between metering chamber 39 and overflow chamber 45 in vessel 46. Equalizing connection 47 in controlled by valve 48 and connects from metering chamber 39 of vessel 38 into overflow chamber 45.

Outlet duct 50 extends from the lower portion of metering chamber 39, through valve 51 into chamber 49a of vessel 46. Valve 52 controls the flow of liquids from chamber 49 of vessel 46 through connection 53 into surge chamber 40 of vessel 38. Pump 54 is connected into outlet duct 55 from surge chamber 40 to pump the metered liquids to a pipeline or suitable storage (not shown).

Overflow chamber 45 is separated from chamber 49 by partition 56. Also, overflow chamber 45 is divided into inlet chamber 57 and leveling chamber 58 by vertical partition 59. Duct 60 controlled by valve 61 connects the lower portions of chambers 57 and 58. Liquid level pilot 62 has its float 63 positioned within inlet chamber 57 and liquid level pilot 64 has its float 65 within leveling chamber 58. Liquid level pilot 66 is connected into chamber 49a so that float 67 of pilot 66 will sense the level of liquids within chamber 49a. Also, in a similar manner the level of liquids within surge chamber 40 is sensed by float 68 which operates liquid level pilot 69.

Pilot valve 70 is used in cooperatoin with pilots 62, 64, 66 and 69 to control the operation of the system of FIG. 2. Supply gas is provided to this control system through gas supply line 71. Line 71 connects into inlet port 72 of pilot valve 70, through liquid level pilot 62 to actuator 73 of pilot valve 70, through liquid level pilot 64, special valve 74 which allows full flow in this direction and restricts flow in the opposite direction, to valves 48 and 61, through check valve 75 to connect into port 76 of pilot valve 70 and through liquid level pilot 69 to pump 54. Port 76 also connects through liquid level pilot 66 to the exhaust connection of liquid level pilot 62 and also through special valve 77 (similar to valve 74) to valve 51. Port 78 of pilot valve 70 connects to valve 43 and through special valve 79 to valve 42 in inlet 41. Pilot valve 70 is constructed to exhaust supply gas either from port 76 through exhaust 80 or from port 78 through exhaust 80. Thus, when port 78 is connected to exhaust 80, port 76 will be connected to inlet port 72.

In operation, the system illustrated in FIG. 1 will operate to meter liquids flowing into metering vessel 1 through inlet connection 2. Under conditions of initial filling of metering vessel 1, valves 3 and 7 will be open and valves 5, 9 and 20 will be closed. Floats 18, 22 and 26 will all be in their lowermost positions initially. As the filling of metering vessel 1 is completed, the excess liquid will flow through overflow connection 6 and valve 7 into section 12a of overflow chamber 12.

As the level of liquid in section 12a rises, float 18 will rise and actuate liquid level pilot 17 allowing control gas to be delivered to actuator 33 of pilot valve 28 thereby moving pilot valve 28 to a position in which ports 29 and 30 are connected and ports 31 and 32 are connected. Control gas will be supplied from port 30 through check valve 36 to valve 20 thereby opening valve 20, to valve 9 thereby opening valve 9 and to special valve 35 which is connected to liquid level pilot 21. Special valve 35 is constructed to allow only a slow bleeding of control gas in the direction toward pilot 21. Since float 22 within section 12b is in its lowermost position, control gas from supply line 34 is blocked within pilot 21 and the line between pilot 21 and special valve 35 is being exhausted therethrough. Control gas is also supplied from port 30 through special valve 37 as hereinafter described to outlet valve 5. Special valve 37 is similar to special valve 35 as it restricts the flow of control gas flowing to outlet valve 5 to allow outlet valve 5 to remain closed for a period of time. This time peroid assures the closing of inlet valve 3 and valve 7 before outlet valve 5 is opened. Control gas is also supplied to liquid level pilot 25 but since float 26 within lower chamber 10 of vessel 11 is in its lower position, no control gas will pass through pilot 25. Control gas is exhausted through special valve 37a and port 31 from inlet valve 3 causing it to close and is exhausted through exhaust port 32 of pilot valve 28. Control gas is also exhausted from valve 7 through pilot valve 28 causing valve 7 to close.

The foregoing control action causes the liquid flow into metering vessel 1 and overflow into section 12a to be shut off. A portion of the liquid within chamber 12a flows through duct 19 and valve 20 into section 12b causing float 18 to drop and float 22 to rise. After the time delay of flow of control gas through valve 37, outlet valve 5 will open allowing the metered liquid to flow through outlet connection 4, and valve 5 into lower chamber 10 of vessel 11. As the liquid fills chamber 10, float 26 will rise actuating liquid level pilot 25. The drop of float 18 places the exhaust connection of pilot 17 in communication with actuator 33 of pilot valve 28. Since this exhaust connection of pilot 17 is connected to pilot 25, actuator 33 remains under pressure of control gas.

Valve 9 is open during the period when metering vessel 1 is discharging the volume of metered liquids. This allows gas pressure to be used to aid in the discharge of liquids from metering vessel 1. As additional liquids are discharged into chamber 10 the liquids will flow up duct 24 into chamber 13 and will be discharged therefrom through discharge duct 27. When metering vessel 1 is emptied, as will flow into chamber 10 forcing additional liquid into chamber 13 and thereby causing the liquid level to drop. Thus, float 26 will drop and actuate liquid level pilot 25 to a position exhausting the control gas from actuator 33 of pilot valve 28 through liquid level pilot 17 thereby actuating pilot valve 28.

The actuation of pilot valve 28 will connect port 29 to port 31. Also, port 30 is connected to exhaust port 32. Control gas will be exhausted from the line leading to liquid level pilot 25 and from valve 5 through special valve 37 without restriction causing valve 5 to close. Check valve 36 will prevent the exhausting of control gas from valve 20 and valve 9. Control gas will be supplied to valve 7 causing it to open and allowing the liquid in both sections 12a and 12b of chamber 12 to drain into metering vessel 1. Also, control gas will be supplied through special valve 37a to valve 3, causing valve 3 to open after a short time delay. This time delay is controlled by the restriction to the flow of control gas within special valve 37a.

As the liquid from chamber 12 drains into vessel 1 both floats 18 and 22 will drop. With float 22 in its lower position control gas will be slowly exhausted from valve 9 and valve 20 causing them to close. Float 26 will rise in chamber 10 since liquids in chamber 13 will drain back into chamber 10. This will assure complete exhausting of actuator 33 of pilot valve 28 through liquid level pilot 17, liquid level pilot 25 and port 30 to exhaust port 32 of pilot valve 28.

Thus, the operation of the system illustrated in FIG. 1 returns to the filling portion of its cycle. A specific known volume of liquid is metered during each cycle of the system. Also, when metering vessel 1 is completely filled, a short period of time is provided so that any gas in the liquid will escape and not be included as a part of the metered volume of liquids.

The operation of FIG. 2 is similar to the operation of the system illustrated in FIG. 1 as hereinbefore described. The liquids to be metered flow into metering chamber 39 of vessel 38 through inlet 41 and valve 42. After filling is completed, the liquid overflows through duct 44 and valve 43 into inlet chamber 57. The control gas system and its control of the cycle of the system of FIG. 2 is identical to the control gas system previously described in relation to the FIG. 1 system. Liquids are discharged from chamber 39 through outlet duct 50 and valve 51 into chamber 49a. The liquids flow into chamber 49 and are discharged therefrom through duct 53 and valve 52 into surge chamber 40 actuating liquid level pilot 69 which controls the flow of power gas to operate pump 54. When the level of liquids in chamber 40 falls below a certain predetermined level, liquid level pilot 69 shuts off the supply of power gas to pump 54. When the level again rises in chamber 40, pilot 69 opens the flow of power gas to pump 54 to pump liquid from chamber 40. Float 68 and liquid level pilot 69 function as a low level shut-off for pump 54. Float 63 and liquid level pilot 62 in conjunction with float 67 and liquid level pilot 66 control the operation of pilot valve 70. Pilot valve 70 controls the operation of valves 42, 43 and 51. Thus, pilot valve 70 is a convenient means of counting the number of cycles of the equipment, for example, counter 81 connected to the stem of pilot valve 70 in FIG. 2 and counter 82 connected to the stem of pilot valve 28 in FIG. 1.

From the foregoing description of the systems of the present invention it can be seen that we have provided an apparatus which will automatically meter a liquid in cycles and discharge the liquid from the metering system. Also, the present invention provides a settling time during which gas trapped in the meter will escape thereby providing a specific volume of liquid with every metering cycle. Further, the present invention provides for the rapid discharge of liquid from the metering vessel, utilizing the pressure in the system. The controls of the present invention provide complete filling and discharge of the metering vessel during each metering cycle. Still further, the present invention provides for the automatic resetting of pilots to accomplish the necessary metering cycles. The metering of the present invention is accomplished by containing the liquid to be metered in a vessel and defining the volume by valves whereby a specific known volume is defined during each metering cycle.

What we claim and desire to secure by Letters Patent is:

1. A liquid metering apparatus comprising, a metering vessel, said metering vessel having an inlet, an outlet and an overflow line, valve means in said inlet, said outlet and said overflow line of said metering vessel, an auxiliary vessel, said auxiliary vessel having upper and lower transverse partitions positioned completely across the interior of said auxiliary vessel and dividing said auxiliary vessel into an upper, an intermediate and a lower chamber, an upright partition within said upper chamber dividing said upper chamber into a first section and a second section, means equalizing pressure between said metering vessel and both sections of said upper chamber, a drain connecting said first section of said upper chamber to said second section of said upper chamber, valve means in said drain, a first float positioned in said first section of said upper chamber, a first control mechanism operably connected to said first float, a second float positioned in said second section of said upper chamber, a second control mechanism operably connected to said second float, a third float positioned in said lower chamber, a third control mechanism operably connected to said third float, a duct connecting said lower chamber to said intermediate chamber, the lower edge of said duct extending below the lowest operating level of said third float, means equalizing pressure between said lower and said intermediate chambers of said auxiliary vessel, said outlet from said metering vessel connecting into said lower chamber of said auxiliary vessel, said overflow line from said metering vessel connecting into said first section of said upper chamber of said auxiliary vessel, an outlet from said intermediate chamber of said auxiliary vessel, a two position pressure actuated pilot valve, a source of supply gas connected into said pilot valve, means connecting said source of supply gas from said pilot valve to said valve means and said control mechanisms to cause said metering vessel to fill and empty whereby the liquid contained therein is effectively metered, and a time delay restriction valve in the means connecting from said pilot valve to said valve means in said inlet of said metering vessel to delay the opening of said valve means in said inlet until sufficient time has elapsed to allow the draining of the upper chamber of said auxiliary vessel.

2. Invention according to claim 1 including, a surge tank incorporated with said metering vessel to form a single structure, a float in said surge tank, a control mechanism connected to said float in said surge chamber, duct means connecting said intermediate chamber to said surge tank, a discharge duct from said surge tank, and a pump in said discharge duct from said surge tank, sod pump being controlled by said control mechanism associated with said float in said surge tank.

References Cited in the file of this patent
UNITED STATES PATENTS

| | | |
|---|---|---|
| 2,773,556 | Meyers et al. | Dec. 11, 1956 |
| 2,831,350 | Banks et al. | Apr. 22, 1958 |
| 2,872,817 | Pitts | Feb. 10, 1959 |

OTHER REFERENCES

An article entitled, "Lease Automatic Custody Transfer Becomes a Reality" by Pope et al., in the Oil and Gas Journal, vol. 54, No. 48, April 23, 1956, pp. 96–102. (Copy available in Div. 36.)

The Oil and Gas Journal, July 30, 1956, pp. 122, 123, (Phillip's Proposal).